United States Patent [19]

Hiramatsu

[11] Patent Number: 5,138,444
[45] Date of Patent: Aug. 11, 1992

[54] IMAGE PICKUP SYSTEM CAPABLE OF PRODUCING CORRECT IMAGE SIGNALS OF AN OBJECT ZONE

[75] Inventor: Masaru Hiramatsu, Tokyo, Japan
[73] Assignee: NEC Corporation, Japan
[21] Appl. No.: 755,553
[22] Filed: Sep. 5, 1991
[51] Int. Cl.$^5$ ............................................. H04N 13/07
[52] U.S. Cl. ...................................... 358/88; 358/109; 358/103
[58] Field of Search ....................... 358/88, 109, 3, 103

[56] References Cited

U.S. PATENT DOCUMENTS

| | | | |
|---|---|---|---|
| 4,689,748 | 8/1987 | Hofmann | 358/103 |
| 4,951,136 | 8/1990 | Drescher | 358/109 |
| 5,027,199 | 6/1991 | Suzuki | 358/88 |

Primary Examiner—Howard W. Britton
Attorney, Agent, or Firm—Ostrolenk, Faber, Gerb & Soffen

[57] ABSTRACT

In an image pickup system for use in a craft (11) flying over an object zone which moves independently relative to the craft, first and second electric signals represent first and second partial zones when the craft is at first and second locations at a first time instant and at a second time instant which is later than the first time instant. The first and the second partial zones are a forward partial zone Pf viewed by a first camera unit (13) and a backward partial zone Pb viewed by a second camera unit (14). Due to movement of the object zone, the first and the second partial zones are different by a difference zone. Supplied with first and second location signals produced by a location signal producing unit (15) represent the first and the second locations, a correcting signal producing unit (16) produces an overall correcting signal representative of the difference zone. By the overall correcting signal, a processing unit (17) processes the first and the second electric signals into first and second image signals for use in producing a stereo image of the object zone. An equivalent of the location signal producing unit may be located in a terrestrial station (20).

10 Claims, 3 Drawing Sheets

IMAGE PICKUP SYSTEM CAPABLE OF PRODUCING CORRECT IMAGE SIGNALS OF AN OBJECT ZONE

BACKGROUND OF THE INVENTION

This invention relates to an image pickup system for use in combination with a craft, such as a spacecraft and an aircraft, flying over an object zone which is typically on the Earth's surface. Such an image pickup system is particularly useful in a remote sensing system for the Earth.

An image pickup system of the type described is used to remotely sense an object zone on board a craft flying over the object zone along a flying direction at a predetermined flight altitude. In a remote sensing system, it is often necessary to pick up a stereo image, such as a stereo topographic image, from the object zone by the use of the image pickup system. In order to provide the stereo image, the object zone should be picked up, along the flying direction at two locations spaced apart from each other, so as to form two optical images of the object zone.

A conventional image pickup system comprises a first signal producing system and a second signal producing system. The first signal producing system produces a first electric signal representative of a first partial zone of the object zone when the craft flies at a first time instant at a first location at which the first partial zone is viewed. The second signal producing system produces a second electric signal representative of a second partial zone viewed in the object zone when the craft flies at a second location at a second time instant which is later than the first time instant.

The object zone is typically on the Earth. The craft moves relative to the Earth. In addition, the Earth rotates while the craft moves from the first location to the second location. It is therefore possible to say that the object zone moves independently relative to the craft. As a result, the first and the second partial zones are different by a different zone. Consequently, the image pickup system is incapable of producing correct image signals for use in producing the stereo image of the object zone.

SUMMARY OF THE INVENTION

It is therefore an object of this invention to provide an image pickup system which is capable of producing correct image signals for use in producing a stereo image of an object zone.

Other objects of this invention will become clear as the description proceeds.

According to this invention, there is provided an image pickup system for use in a craft flying over an object zone which is moving independently relative to the craft. The image pickup system comprises in the craft first signal producing means for producing a first electric signal representative of a first partial zone of the object zone when the craft flies at a first time instant at a first location at which the first partial zone is viewed, second signal producing means for producing a second electric signal representative of a second partial zone viewed in the object zone when the craft flies at a second location at a second time instant which is later than the first time instant, the first and the second partial zones being different by a difference zone, correcting signal producing means supplied with first and second location signals representative of the first and the second locations for producing an overall correcting signal representative of the difference zone, and processing means connected to the first and the second signal producing means and the correcting signal producing means for processing by the overall correcting signal the first and the second electric signals into first and second image signals for use in producing a stereo image of the object zone.

DESCRIPTION OF THE PREFERRED EMBODIMENT

Figure 1:
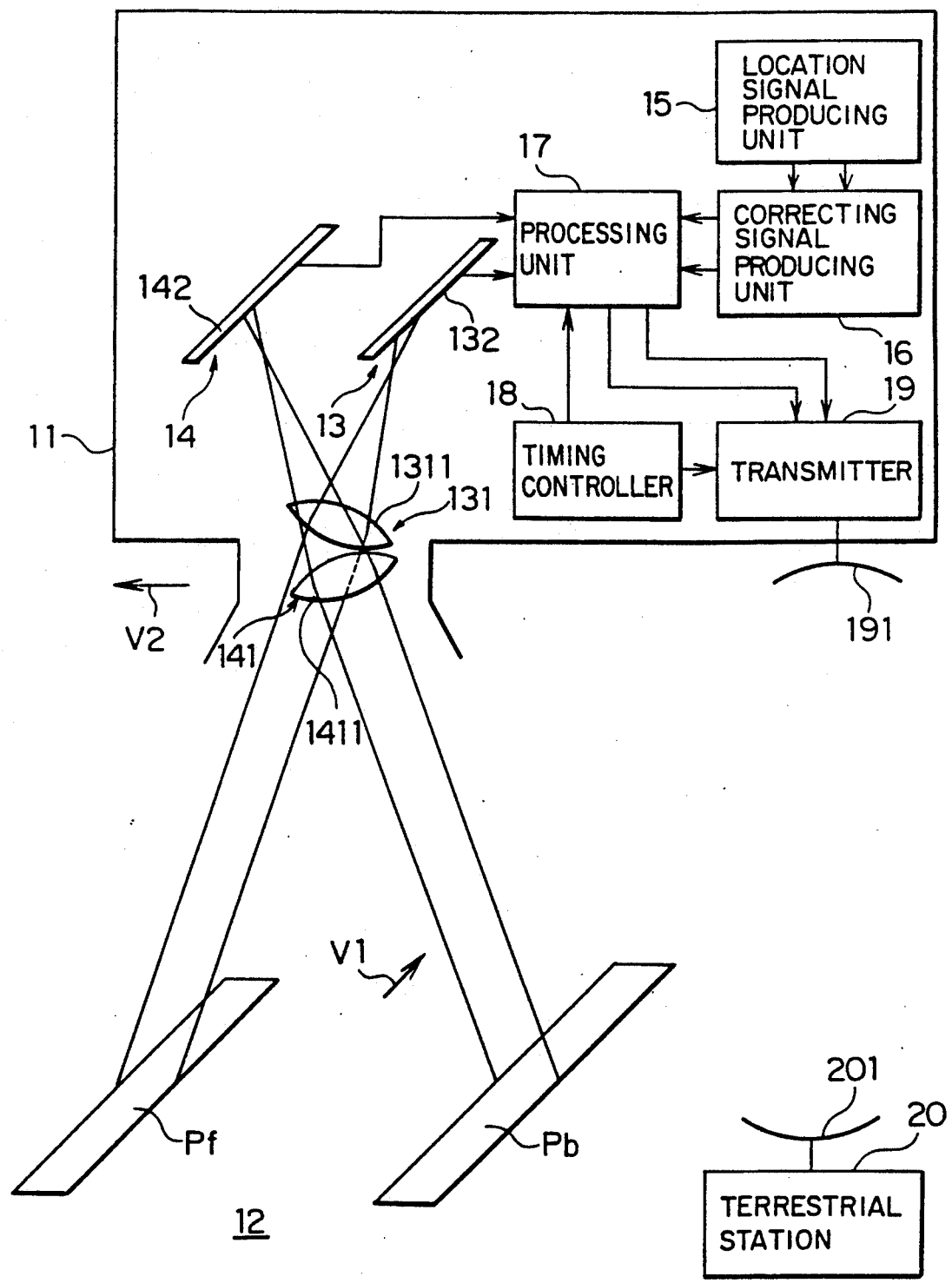
FIG. 1 is a partially perspective pictorial view of an object zone and a craft for use in describing an image pickup system according to an embodiment of this invention.

Referring to FIG. 1, an image pickup system according to a preferred embodiment of this invention is for use in a craft 11 flying over an object zone 12 which is typically on the Earth. Inasmuch as the Earth rotates, the object zone 12 moves with a zone velocity V1 relative to the center of the Earth. The craft 11 is typically a space craft. Alternatively, the craft 11 may be an aircraft. In any event, the craft 11 moves with a craft velocity V2 relative to the center of the Earth. It is therefore possible to say that the object zone 12 moves independently relative to the craft 11.

The image pickup system comprises in the craft 11 a first camera unit 13, a second camera unit 14, a location signal producing unit 15, a correcting signal producing unit 16, and a processing unit 17, all of which will become clear as the description proceeds. In addition, a timing controller 18 and a transmitter 19 are installed in the craft 11. The image pickup system may be used in combination with a terrestrial station 20. In this event, an equivalent of the location signal producing unit 15 may be installed in the terrestrial station 20.

The first camera unit 13 produces a forward electric signal representative of a forward partial zone Pf of the object zone 12. At the same time, the second camera unit 14 produces a backward electric signal representative of a backward partial zone Pb of the object zone 12.

Figure 2:
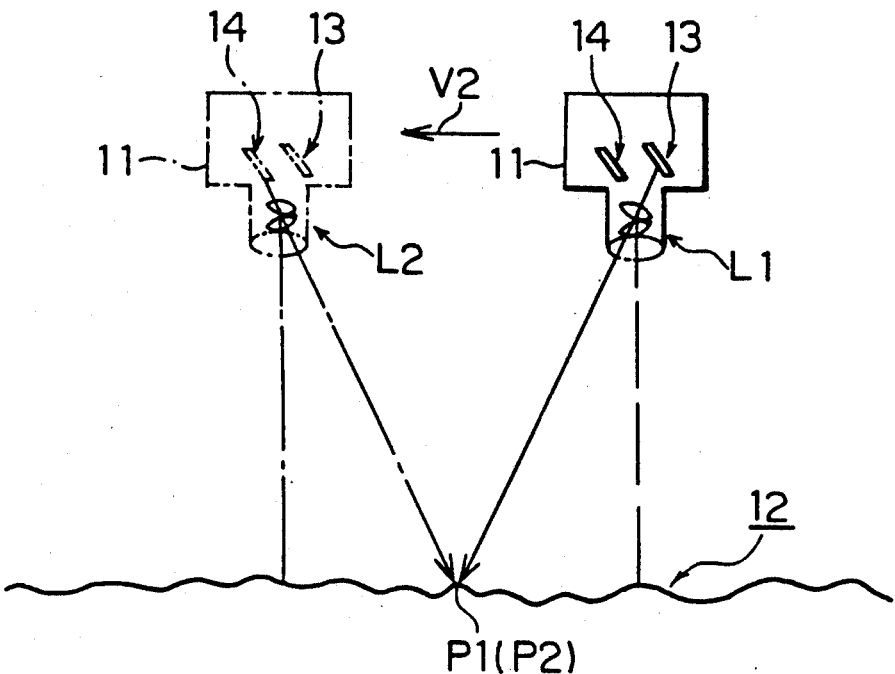
FIG. 2 is a pictorial side view of the object zone and the craft at two locations for use in describing the image pickup system illustrated in FIG. 1.

Referring to FIG. 2 in addition to FIG. 1, the craft 11 is depicted at first and second locations L1 and L2. When the craft 11 is at the first location L1 at a first time instant, the forward partial zone Pf is viewed as a first partial zone P1. When the craft 11 is at the second location L2 at a second time instant which is a predetermined time interval later than the first time instant, the backward partial zone Pb is viewed as a second partial zone P2. The first and the second partial zones P1 and P2 will be discussed more in detail in the following.

In FIGS. 1 and 2, the first camera unit 13 produces the forward electric signal as a first electric signal representative of the first partial zone P1. The first camera unit 13 comprises a first lens system 131 for producing a first image of the first partial zone P1 and a first image processor 132 for processing the first image into the first electric signal. The first lens system 131 includes a lens 1311 having a first focal length for forming the first image.

The second camera unit 14 produces the backward electric signal as a second electric signal representative of the second partial zone P2. The second camera unit 14 comprises a second lens system 141 for producing a second image of the second partial zone P2 and a second image processor 142 for processing the second image into the second electric signal. The second lens system 141 includes a lens 1411 having a second focal length for forming the second image. It is possible to understand without loss of generality that the first and the second focal lengths are equal to each other. The first or the second focal length may therefore be referred to as a common focal length.

Figure 3:
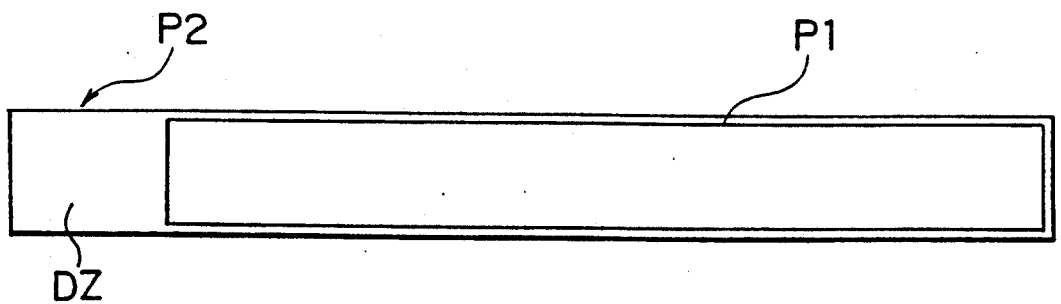
FIG. 3 is a top view of a first partial zone and a second partial zone of the object zone for use in describing the image pickup system illustrated in FIG. 1.

The object zone 12 moves while the craft 11 moves from the first location L1 to the second location L2. The first and the second partial zones P1 and P2 are therefore different by a difference zone DZ (FIG. 3).

Figure 4:
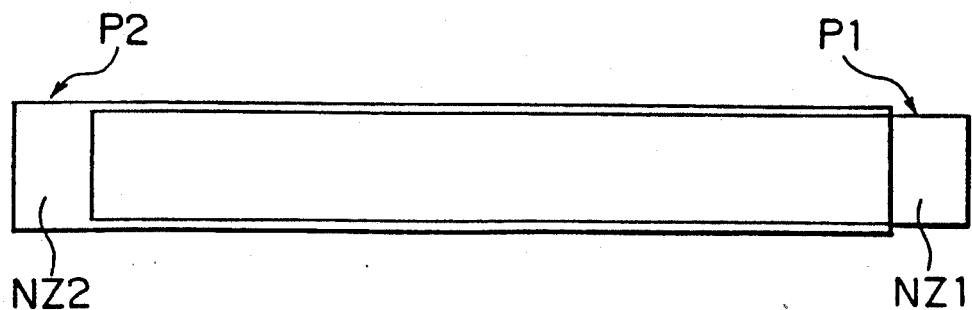
FIG. 4 is an another top view of the first partial zone and the second partial zone of the object zone for use in describing the image pickup system illustrated in FIG. 1.

Referring to FIG. 4, the first and the second partial zones P1 and P2 partially overlap on each other to leave a first nonoverlapped zone NZ1 in the first partial zone P1 and a second nonoverlapped zone NZ2 in the second partial zone P2. The first and the second nonoverlapped zones NZ1 and NZ2 collectively providing the difference zone DZ described in conjunction with FIG. 3. The first nonoverlapped zone NZ1 has a first area. The second nonoverlapped zone NZ2 has a second area. The difference zone DZ has a collective area. The collective area is equal to a sum of the first area and the second area.

Referring more particularly to FIG. 2, the craft 11 views the first partial zone P1 in a first direction from the first location L1 and the second partial zone P2 in a second direction from the second location L2. Being considerably remote from the Earth, the craft 11 has a common space distance from each of the first and the second partial zones P1 and P2.

Figure 5:
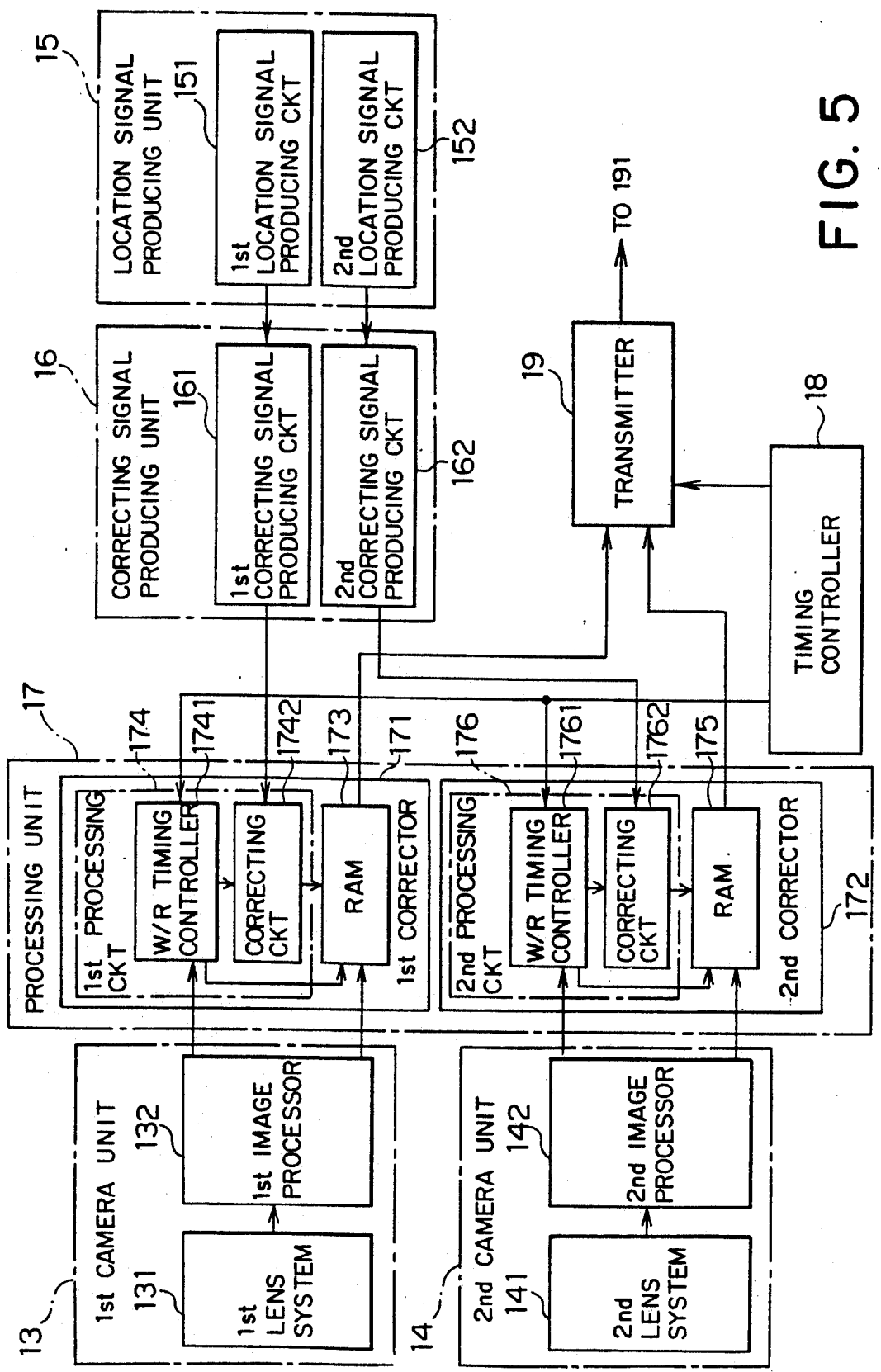
FIG. 5 is a block diagram of the image pickup system illustrated in FIG. 1.

Referring to FIG. 5, the location signal producing unit 15 comprises a first location signal producing circuit 151 and a second location signal producing circuit 152. The first location signal producing circuit 151 produces the first location signal representative of the first location L1 by using the first direction and the common space distance. The second location signal producing circuit 152 produces the second location signal representative of the second location L2 by using the second direction and the common space distance.

The correcting signal producing unit 16 is connected to the location signal producing unit 15 and produces an overall correcting signal by calculating a distance quotient of the common focal length by the common space distance and a three-term product of the distance quotient, the zone velocity V1, and the predetermined time interval by making the overall correcting signal represent the three-term product. It therefore follows that the overall correcting signal specifies the difference zone DZ (FIG. 3).

More specifically, the correcting signal producing unit 16 comprises a first correcting signal producing circuit 161 connected to the first location signal producing circuit 151 and a second correcting signal producing circuit 162 connected to the second location signal producing circuit 152.

The first correcting signal producing circuit 161 is connected to the first location signal producing circuit 151 and produces the first correcting signal by calculating a distance quotient of the common focal length by the common space distance, a first quotient of the first area by the collective area, and first four-term product of the distance quotient, the zone velocity V1, the predetermined time interval, and the first quotient and by making the first correcting signal represent the first four-term product. As a result, the first correcting signal specifies the first nonoverlapped zone NZ1 (FIG. 4).

The second correcting signal producing circuit 162 is connected to the second location signal producing circuit 152 and produces the second correcting signal by calculating the distance quotient, a second quotient of the second area by the collective area, and a second four-term product of the distance quotient, the zone velocity V1, the predetermined time interval, and the second quotient and by making the second correcting signal represent the second four-term product. As a consequence, the second correcting signal specifies the second nonoverlapped zone NZ2 (FIG. 4).

The processing unit 17 is connected to the first and the second cameras 13 and 14 and the correcting signal producing unit 16 and processes by the overall correcting signal the first and the second electric signals into first and second image signals for use in producing a stereo image of the object zone 12.

The processing unit 17 comprises a first corrector 171 and a second corrector 172. The first corrector 171 comprises a first RAM 173 connected to the first image processor 132 and a first processing circuit 174 connected to the first correcting signal producing circuit 161 and the first RAM 173.

The first processing circuit 174 comprises a first read and write timing controller 1741 connected to the first image processor 132, the first RAM 173, and the timing controller 18 and a first correcting circuit 1742 connected to the first correcting signal producing circuit 161, the first read and write timing controller 1741, and the first RAM 173. The first image processor 132 produces a first write timing signal while producing the first electric signal. The timing controller 18 produces a read timing signal.

The first read and write timing controller 1741 is supplied with the first write timing signal and supplies a first write signal to the first RAM 173. Supplied with the first electric signal from the first image processor 132 and with the first write signal, the first RAM 173 memorizes the first electric signal as a first memorized signal. The first memorized signal comprises a first partial portion and a first remaining partial portion which indicate the first nonoverlapped zone NZ1 and a remaining zone of the first partial zone PZ1, respectively.

The first read and write timing controller 1741 is supplied with the read timing signal from the timing controller 18 and delivers a first read command signal to the first correcting circuit 1742. Supplied with the first correcting signal from the first correcting signal producing circuit 161 and with the first read command signal, the first correcting circuit 1742 produces a first read control signal which comprises a first inhibit signal and a first read signal. The first inhibit signal is produced while the first correcting circuit 1742 is supplied with the first correcting signal. Supplied with the first inhibit signal, the first RAM 173 is inhibited from producing the first partial portion indicating the first nonoverlapped zone NZ1. Supplied with the first read signal, the first RAM 173 produces the first image signal.

The second corrector 172 comprises a second RAM 175 connected to the second image processor 142 and a second processing circuit 176 connected to the second correcting signal producing circuit 162 and the second RAM 176. The second processing circuit 176 comprises a second read and write timing controller 1761 connected to the second image processor 142, the second RAM 175, and the timing controller 18 and a second correcting circuit 1762 connected to the second correcting signal producing circuit 162, the second read and write timing controller 1761, and the second RAM 175. The second image processor 142 produces a second write timing signal while producing the second electric signal.

The second read and write timing controller 1761 is supplied with the second write timing signal and supplies a second write signal to the second RAM 175. Supplied with the second electric signal from the second image processor 142 and with the second write signal, the second RAM 175 memorizes the second electric signal as a second memorized signal. The second memorized signal comprises a second partial portion and a second remaining partial portion which indicate the second nonoverlapped zone NZ2 and a remaining zone of the second partial zone PZ2, respectively.

The second read and write timing controller 1761 is supplied with the read timing signal from the timing controller 18 and delivers a second read command signal to the second correcting circuit 1762. Supplied with the second correcting signal from the second correcting signal producing circuit 162 and with the second read command signal, the second correcting circuit 1762 produces a second read control signal which comprises a second inhibit signal and a second read signal. The second inhibit signal is produced while the second correcting circuit 1762 is supplied with the second correcting signal. Supplied with the second inhibit signal, the second RAM 175 is inhibited from producing the second partial portion indicating the second nonoverlapped zone NZ2. Supplied with the second read signal, the second RAM 175 produces the second image signal. It is now understood that the timing controller 18 should produce the read timing signal immediately after the first and the second electric signals are entirely memorized in the first and the second RAMs 173 and 175.

The transmitter 19 is connected to the first RAM 173, the second RAM 175, and the timing controller 18. The timing controller 18 produces a transmission timing signal for supply to the transmitter 19 while the first and the second RAMs 173 and 175 produces the first and the second image signals. Supplied with the first image signal, the second image signal, and the transmission timing signal, the transmitter 19 transmits the first and the second image signals to the terrestrial station 20 through an antenna 191 (FIG. 1) of the craft 11. Supplied with the first and the second image signals through an antenna 201 (FIG. 1), the terrestrial station 20 produces a stereo image of the object zone 12 by using the first and the second image signals in a usual manner. Alternatively, the stereo image may be produced by a stereo image producing unit (not shown) which is installed in the craft 11.

While this invention has thus far been described in conjunction with a single embodiment thereof, it will now be readily possible for those skilled in the art to put this invention into practice in various other manners. For example, the location signal producing unit 15 may be installed in the terrestrial station 20. In this event, the first and the second location signals are supplied to the correcting signal producing unit 16 through the antennas 201 and 191.

What is claimed is:

1. An image pickup system for use in a craft flying over an object zone which is moving independently relative to said craft, said image pickup system comprising in said craft:

first signal producing means for producing a first electric signal representative of a first partial zone of said object zone when said craft flies at a first time instant at a first location at which said first partial zone is viewed;

second signal producing means for producing a second electric signal representative of a second partial zone viewed in said object zone when said craft flies at a second location at a second time instant which is later than said first time instant, said first and said second partial zones being different by a difference zone;

correcting signal producing means supplied with first and second location signals representative of said first and said second locations for producing an overall correcting signal representative of said difference zone; and processing means connected to said first and said second signal producing means and said correcting signal producing means for processing by said overall correcting signal said first and said second electric signals into first and second image signals for use in producing a stereo image of said object zone.

2. An image pickup system as claimed in claim 1, said craft viewing said first partial zone in a first direction from said first location and viewing said second partial zone in a second direction from said second location, said craft having a space distance from each of said first and said second partial zones, wherein said image pickup system further comprises in said craft:

first location signal producing means connected to said correcting signal producing means for producing said first location signal in compliance with said first direction and said space distance; and second location signal producing means connected to said correcting signal producing means for producing said second location signal in compliance with said second direction and said space distance.

3. An image pickup system as claimed in claim 1, said craft being for use in combination with a terrestrial station, said craft viewing said first partial zone in a first direction from said first location and viewing said second partial zone in a second direction from said second location, said craft having a space distance from each of said first and said second partial zones, wherein said image pickup system further comprises in said terrestrial station:

first location signal producing means for producing said first location signal in compliance with said first direction and said space distance; and second location signal producing means for producing said second location signal in compliance with said second direction and said space distance.

4. An image pickup system as claimed in claim 1, said object zone moving with a velocity independently relative to said craft, said second time instant being a predetermined time interval later than said first time instant, each of said first and said second signal producing means including a lens having a focal length for forming each of first and second images representative of said first and said second partial zones and image processors for processing said first and said second images into said first and said second electric signals, said craft having a space distance from each of said first and said second partial zones, wherein said correcting signal producing means is for producing said overall correcting signal by calculating a distance quotient of said focal length by said space distance and a three-term product of said distance quotient, said velocity, and said predetermined time interval and by making said overall correcting signal represent said three-term product.

5. An image pickup system as claimed in claim 4, wherein said processing means comprises a first corrector and a second corrector, said first corrector comprising a first memory connected to said first signal producing means for memorizing said first electric signal as a first memorized signal and a first processing circuit connected to said correcting signal producing means and said first memory for processing said first memorized signal by said first correcting signal into said first image signal, said second corrector comprising a second memory connected to said second signal producing means for memorizing said second electric signal as a second memorized signal and a second processing circuit connected to said correcting signal producing means and said second memory for processing said second memorized signal by said second correcting signal into said second image signal.

6. An image pickup system as claimed in claim 1, said first and said second partial zones partially overlapping on each other to leave a first nonoverlapped zone in said first partial zone and a second nonoverlapped zone in said second partial zone, said first and said second nonoverlapped zones collectively providing said difference zone, wherein:
said correcting signal producing means is for producing first and second correcting signals collectively as said overall correcting signal, said first and said second correcting signal representing said first and said second nonoverlapped zones.

7. An image pickup system as claimed in claim 6, said craft viewing said first partial zone in a first direction from said first location and viewing said second partial zone in a second direction from said second location, said craft having a space distance from each of said first and said second partial zones, wherein said image pickup system further comprises in said craft:
first location signal producing means connected to said correcting signal producing means for producing said first location signal in compliance with said first direction and said space distance; and
second location signal producing means connected to said correcting signal producing means for producing said second location signal in compliance with said second direction and said space distance.

8. An image pickup system as claimed in claim 6, said craft being for use in combination with a terrestrial station, said craft viewing said first partial zone in a first direction from said first location and viewing said second partial zone in a second direction from said second location, said craft having a space distance from each of said first and said second partial zones, wherein said image pickup system further comprises in said terrestrial station:
first location signal producing means for producing said first location signal in compliance with said first direction and said space distance; and
second location signal producing means for producing said second location signal in compliance with said second direction and said space distance.

9. An image pickup system as claimed in claim 6, said object zone is moving with a velocity independently relative to said craft, said second time instant being a predetermined time interval later than said first time instant, each of said first and said second signal producing means including a lens having a focal length for forming each of first and second images representative of said first and said second partial zones and image processors for processing said first and said second images into said first and said second electric signals, said craft having a space distance from each of said first and said second partial zones, said first nonoverlapped zone having a first area, said second nonoverlapped zone having a second area, said difference zone having a collective area, wherein said correcting signal producing means comprises:
a first correcting signal producing circuit for producing said first correcting signal by calculating a distance quotient of said focal length by said space distance, a first quotient of said first area by said collective area, and first four-term product of said distance quotient, said velocity, said predetermined time interval, and said first quotient and by making said first correcting signal represent said first four-term product; and
a second correcting signal producing circuit for producing said second correcting signal by calculating said distance quotient, a second quotient of said second area by said collective area, and a second four-term product of said distance quotient, said velocity, said predetermined time interval, and said second quotient and by making said second correcting signal represent said second four-term product.

10. An image pickup system as claimed in claim 9, wherein said correcting means comprises a first corrector and a second corrector, said first corrector comprising a first memory connected to said first signal producing means for memorizing said first electric signal as a first memorized signal and a first correcting circuit connected to said correcting signal producing means and said first memory for correcting said first memorized signal by said first correcting signal into said first image signal, said second corrector comprising a second memory connected to said second signal producing means for memorizing said second electric signal as a second memorized signal and a second correcting circuit connected to said correcting signal producing means and said second memory for correcting said second memorized signal by said second correcting signal into said second image signal.

* * * * *